(12) United States Patent
Lim et al.

(10) Patent No.: US 8,505,044 B2
(45) Date of Patent: Aug. 6, 2013

(54) METHOD AND APPARATUS FOR RECEIVING BROADCASTING SIGNAL, AND BROADCASTING SYSTEM USING THE SAME

(75) Inventors: Dae Jin Lim, Seoul (KR); Hak Joo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 12/605,708

(22) Filed: Oct. 26, 2009

(65) Prior Publication Data

US 2010/0319036 A1 Dec. 16, 2010

(30) Foreign Application Priority Data

Jun. 12, 2009 (KR) .................. 10-2009-0052523
Jun. 12, 2009 (KR) .................. 10-2009-0052550

(51) Int. Cl.
*H04N 7/10* (2006.01)

(52) U.S. Cl.
USPC ............................................. 725/32; 725/87

(58) Field of Classification Search
None
See application file for complete search history.

(56) References Cited

U.S. PATENT DOCUMENTS

| 5,754,940 | A * | 5/1998 | Smith et al. ............... 725/100 |
| 6,804,824 | B1 * | 10/2004 | Potrebic et al. ............... 725/38 |
| 7,168,048 | B1 * | 1/2007 | Goossen et al. ............... 715/797 |
| 2002/0083464 | A1 * | 6/2002 | Tomsen et al. ............... 725/112 |

FOREIGN PATENT DOCUMENTS

| KR | 10-2000-0049221 A | 7/2000 |
| KR | 10-2006-0045403 A | 5/2006 |
| KR | 10-0738205 B1 | 7/2007 |

OTHER PUBLICATIONS

PCT International Search Report dated Jun. 14, 2010 issued in Application No. PCT/KR2009/006198.

* cited by examiner

*Primary Examiner* — Brian Pendleton
*Assistant Examiner* — Olugbenga Idowu
(74) *Attorney, Agent, or Firm* — KED & Associates, LLP

(57) ABSTRACT

A broadcast receiving method and apparatus and a broadcasting system using the same are provided. The broadcast receiving method receives a broadcasting signal of a broadcasting channel. The broadcast receiving method receives application data for a data broadcasting service by using a data channel. The broadcast receiving method combines the received broadcasting signal with the received application data, in order for an image of the broadcasting channel and an image of the data broadcasting service in the hotel to be displayed on screen at the same time.

16 Claims, 5 Drawing Sheets

METHOD AND APPARATUS FOR RECEIVING BROADCASTING SIGNAL, AND BROADCASTING SYSTEM USING THE SAME

CROSS-REFERENCE TO RELATED APPLICATIONS

The present application claims priority under 35 U.S.C. 119 and 35 U.S.C. 365 to Korean Patent Applications No. 10-2009-0052550(filed on 12 Jun. 2009) and No. 10-2009-0052523(filed on 12 Jun. 2009), which are hereby incorporated by reference in its entirety.

BACKGROUND

The present disclosure relates to a broadcast receiving method and apparatus, and more particularly, to a broadcasting system, which provides a data broadcasting service in limited spaces such as hotels.

Generally, a broadcast receiving apparatus receives data stream including a broadcasting signal, and extracts video and audio data stream, corresponding to a channel that is desired by a user, using service information which is included in the received data stream to output the extracted stream to a display device.

Recently, by adding additional data to digital broadcasting and transmitting the digital broadcasting with the added data, data broadcasting is serviced which may provide various information to users. For example, the data broadcasting may provide program information on broadcasting channels, caption information, weather information, news information and/or shopping information to the users.

SUMMARY

Embodiments provide a broadcast receiving method and apparatus and a broadcasting system using the same, which can efficiently provide a specialized data broadcasting service to limited spaces such as hotels.

In one embodiment, a broadcast receiving method includes: receiving an signal of a broadcasting channel; receiving application data for a data broadcasting service by using a data channel; and combining the received signal of the broadcasting channel with the received application data, for an image of the broadcasting channel and an image of the data broadcasting service to be displayed on screen at the same time.

In another embodiment, a broadcast receiving apparatus includes: a first tuner receiving an signal of a broadcasting signal of a broadcasting channel; a second tuner extracting a signal of a data channel, and receiving application data for a data broadcasting service; and an image processor combining the received signal of the broadcasting channel with the received application data.

In further another embodiment, a broadcasting system for providing a data broadcasting service in at least one hotel includes: a broadcast transmitting apparatus receiving an external broadcasting signal to transmit the received signal to a broadcast receiving apparatus of a guest room; a data server providing application data for the data broadcasting service in the hotel; a broadcast receiving apparatus receiving a signal of a broadcasting signal which is received from the broadcast transmitting apparatus, receiving the application data through a data channel, and combining the received signal of the broadcasting channel with the received application data, wherein the signal is an signal of a broadcasting channel which is selected by a user; and a display apparatus displaying an image of the broadcasting channel and an image of the data broadcasting service in the hotel on screen at the same time, by using the data which are combined in the broadcast receiving apparatus.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
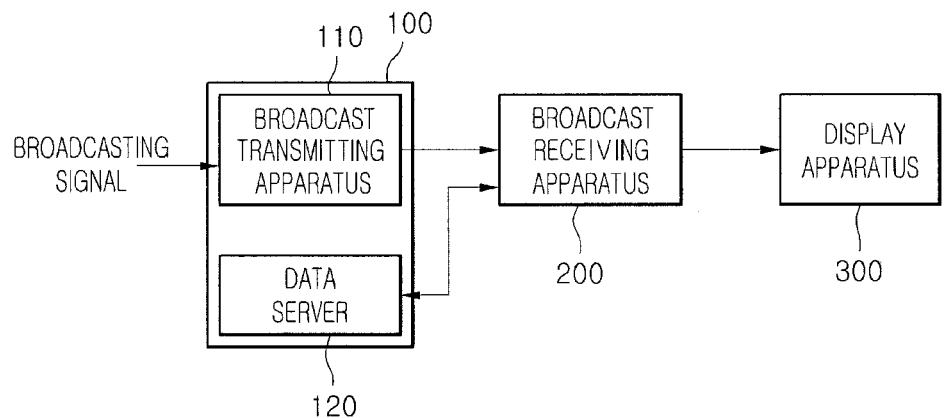
FIG. 1 is a block diagram illustrating the configuration of a broadcasting system according to an embodiment.

FIG. 1 is a block diagram illustrating the configuration of a broadcasting system according to an embodiment. The broadcasting system includes a head end apparatus 100, a broadcast receiving apparatus 200, and a display apparatus 300.

Referring to FIG. 1, the head end apparatus 100 receives a broadcasting signal(which includes a video signal and an audio signal) from the outside to transmit the received signal to the broadcast receiving apparatus 200. The broadcast receiving apparatus 200 may extract and process the received broadcasting signal which corresponds to a channel that is selected by a user, and output the extracted and processed signal to the display apparatus 300.

Specifically, the head end apparatus 100 may include a broadcast transmitting apparatus 110 and a data server 120. The broadcast transmitting apparatus 110 may provide a broadcasting signal, which is received from the outside through satellite broadcasting or cable broadcasting, to the broadcast receiving apparatus 200. The data server 120 may provide application data for a data broadcasting service to the broadcast receiving apparatus 200.

For example, the broadcast transmitting apparatus 110 includes a plurality of broadcasting signal receivers. Accordingly, the broadcast transmitting apparatus 110 receives various contents from a plurality of broadcasting providers over wired/wireless communication networks using terrestrial antennas, satellite antennas and/or cables. The broadcast transmitting apparatus 110 allocates the received contents to a plurality of broadcasting channels and thereby transmits the contents to the broadcast receiving apparatus 200.

The broadcast receiving apparatus 200 may receive the signal of a broadcasting channel that is selected by a user among a broadcasting signal which is transmitted from the broadcast transmitting apparatus 110. The broadcast receiving apparatus 200 may receive application data for data broadcasting that is transmitted from the data server 120.

The broadcast receiving apparatus 200 may respectively change the received broadcasting signal of the broadcasting channel and the application data for data broadcasting into a signal type and a data type that may be outputted in the display apparatus 300, and output the changed signal and data to the display apparatus 300.

The display apparatus 300 may display the image of the broadcasting channel by using the image signal that is inputted from the broadcast receiving apparatus 200, and provide a data broadcasting service according to a user's request.

The broadcast receiving apparatus 200 may be a set-top box (STB) that receives a broadcasting signal over wired/wireless networks, changes the received broadcasting signal into a signal type which may be outputted in the display apparatus 300 and outputs the changed signal to the display apparatus 300.

However, the broadcast receiving apparatus 200 is not limited to the STB. The broadcast receiving apparatus 200 may include all sorts of devices that may receive an external broadcasting signal and output the received signal to the display apparatus 300 which is connected in a wired/wireless manner.

The display apparatus 300 displays images corresponding to signals that are inputted from the broadcast receiving apparatus 200. For example, the display apparatus 300 may display the images by using various display devices such as Liquid Crystal Displays (LCD), plasma Display Panels (PDP), Electro Luminescent Displays (ELD) and Vacuum Fluorescent Displays (VFD).

The broadcast receiving apparatus 200 may be connected to the display apparatus 300 through High Definition Multimedia Interfaces (HDMI), Digital Visual Interface (DVI) or D-Sub cables. However, connection between the broadcast receiving apparatus 200 and the display apparatus 300 is not limited to the above-described connection type. The broadcast receiving apparatus 200 and the display apparatus 300 may be connected through various communication type cables. Moreover, connection between the broadcast receiving apparatus 200 and the display apparatus 300 is not limited to the cable type. The broadcast receiving apparatus 200 and the display apparatus 300 may be connected over a wireless network using local area wireless communication such as zigbee communication, bluetooth communication and Wlan communication.

According to an embodiment, the image of a broadcasting channel and the image of a data broadcasting service that are selected by a user may be simultaneously displayed on one screen in the display apparatus 300. For this, the broadcast receiving apparatus 200 may combine the image signal of a broadcasting channel that is received from the broadcast transmitting apparatus 110 with application data that are received from the data server 120, process the broadcasting signal and the application data so as to be displayed on one screen, and output the processed signal and data to the display apparatus 300.

Moreover, the application data that are received from the data server 120 may be for displaying a banner image, which is used for an advertisement, in the display apparatus 300. For example, the application data may be the Java Xlet application for displaying text-based banner advertisements on the screen of the broadcasting channel, in the display apparatus 300.

In order for the broadcast receiving apparatus 200 receive the application data for the data broadcasting service from the data server 120 without changing a broadcasting channel that is currently being viewed, the application data may be transmitted to the broadcast receiving apparatus 200 through a dedicated data channel independent of the broadcasting channels.

That is, the broadcast transmitting apparatus 110 allocates an external broadcasting signal to a plurality of preset broadcasting channels and transmits the allocated signal to the broadcast receiving apparatus 200. The data server 120 transmits the application data to the broadcast receiving apparatus 200 through the separate dedicated data channel independent of the broadcasting channels. Therefore, the broadcast receiving apparatus 200 may simultaneously receive the application data for the data broadcasting and the broadcasting signal of a broadcasting channel that a user is currently viewing.

Accordingly, the user requests a data broadcasting service while viewing a selected broadcasting channel, and thus, it may use the data broadcasting service that is provided by the data server 120 of the head end apparatus 100 while continuously viewing the broadcasting channel without the change of a broadcasting channel.

In FIG. 1, the broadcast receiving apparatus 200 is included as a separate apparatus in the outside of the display apparatus 300. According to another embodiment, however, the broadcast receiving apparatus 200 may be included in the inside of the display apparatus 300 and be implemented as one set.

According to an embodiment, the broadcasting system in FIG. 1 may be used for providing a data broadcasting service in limited spaces such as hotels and hospitals, for example, a specific building.

Hereinafter, a general broadcasting service using external broadcasting signals and a hotel broadcasting system that provides a data broadcasting service in hotels will be exemplified as an embodiment.

That is, the broadcast receiving apparatus 200 and the display apparatus 300 may be disposed in the guest rooms of hotels. The head end apparatus 100 may receive broadcasting signals from the outside over satellites or cables, and transmit application data for data broadcasting of hotels and the received broadcasting signal to a plurality of broadcast receiving apparatuses 200 that are disposed in the guest rooms.

According to an embodiment, the data broadcasting service in hotels may be a service that provides specific information to users by using banners. For example, the data broadcasting service may be a service for displaying both advertisement sentences or information to be provided to the guests in hotels and the images of a broadcasting panel in a banner type on a screen.

Moreover, the data broadcasting service in hotels may include various services, for example, Pay Per View (PPV) services, room services, hotel-related information services, reservation services, checkout information services, entertainment services and game services, that may be provided in hotels, other than the banner advertisement service.

Figure 2:
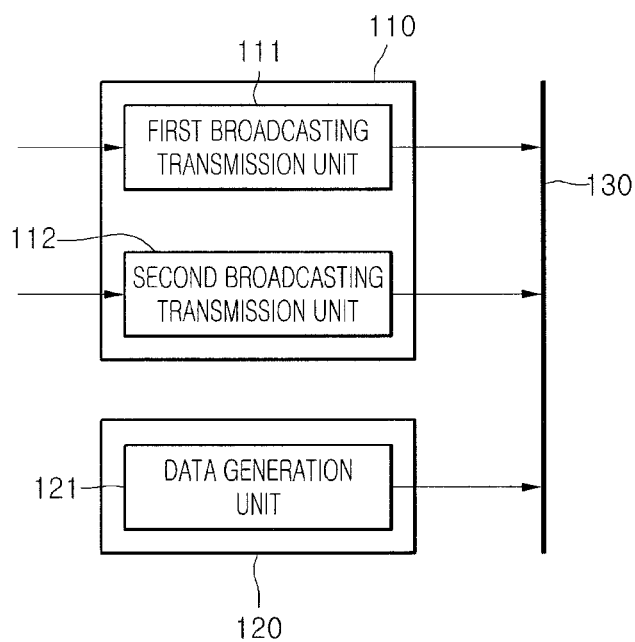
FIG. 2 is a block diagram illustrating the configuration of a head end apparatus which is managed in hotels, according to an embodiment.

FIG. 2 is a block diagram illustrating the configuration of the head end apparatus 100 which is managed in hotels, according to an embodiment. The head end apparatus 100 of a hotel may include a plurality of broadcasting transmission units 111 and 112, and the data server 120 of a hotel which includes a data generation unit 121.

Referring to FIG. 2, the first and second broadcasting transmission units 111 and 112 may receive different kinds of contents from the outside, and more specifically, may receive broadcasting signals from different broadcasting providers or receive broadcasting signals over different communication networks.

For example, the first broadcasting transmission unit 111 may receive broadcasting signals, including content that is provided to the users of hotels without pay, from the outside and transmit the received signal to the broadcast receiving apparatus 200. The first broadcasting transmission unit 111 may include a converter and a transcoder for processing the received broadcasting signal.

Moreover, the first broadcast transmitting apparatus 110 may include an encryption unit and a modulator for processing broadcasting signals that are provided from a specific broadcasting provider (for example, a broadcasting provider for providing pay content).

The second broadcasting transmission unit 112 may receive external broadcasting signals including content that is provided to users with pay and transmit the received signal to the broadcast receiving apparatus 200. The second broadcasting transmission unit 112 may include a Video On Demand (VOD) processor for processing user's requests to the view of pay content, and a converter and a modulator for processing the received broadcasting signal.

The VOD processor may include a CPU, a memory, a VOD multiplexer and a content server, for processing the above-described VOD services.

As illustrated in FIG. 2, the data server 120 of a hotel may include the data generation unit 121 that generates application data for providing data broadcasting services in hotels according to a predetermined data broadcasting protocol.

For example, the data generation unit 121 may generate the application data for the data broadcasting services in hotels according to a GEM-based data broadcasting protocol, and more specifically, an Advanced Common Application Platform (ACAP) standard protocol.

Data broadcasting information based on the ACAP standard protocol may include Application Information Table (AIT) and Digital Storage Media-Command and Control (DSM-CC) data. The AIT and DSM-CC data may be transmitted in a Transport Stream (TS) type.

The AIT includes the presence of data broadcasting and update information. The DSM-CC data include substantial data for servicing data broadcasting, for example, control information including images and text fonts.

The data generation unit 121 may configure the DSM-CC data based on the ACAP standard protocol by using text data, Electronic Program Guide (EPG) or images that represent hotel-related information which is stored in the data server 120.

For providing a banner advertisement service being data broadcasting according to an embodiment, the data generation unit 121 may generate an Xlet being a Java application. The Xlet may be composed of a Java class file which realizes actual motions with Java, a text file including character information, and an image file which represents the menu, icon or picture of a screen.

Referring to FIG. 2, an external broadcasting signal that is received from the broadcast transmitting apparatus and the application data (which is provided from the data server 120) for providing the data broadcasting service in hotels may be transmitted over one communication network 130 together.

That is, a broadcasting signal that is received from the first broadcasting transmission unit 111, a broadcasting signal that is received from the second broadcasting transmission unit 112 and the application data that are generated in the data generation unit 121 may be respectively allocated to different channels and be transmitted to the broadcast receiving apparatus 200 as one broadcasting signal over the communication network 130 which are installed in hotels.

According to an embodiment, the broadcasting signals that are received from the broadcast transmitting apparatus 110 and the application data that are provided from the data server 120 may be transmitted to the broadcast receiving apparatus 200 together over the radio frequency (RF) cables of a hotel.

In this way, by transmitting the application data for providing the data broadcasting service in hotels over the RF cables which are installed for transmitting the broadcasting signal to the broadcast receiving apparatus 200 that is disposed in each of the guest rooms of hotels, the broadcasting system may provide the data broadcasting service in hotels by using existing equipment without installing a separate network in hotels.

As described above, when a user requests the data broadcasting service in hotels, the broadcast receiving apparatus 200 should simultaneously receive the broadcasting signal of the broadcasting channel and the application data for the data broadcasting so that the image of a broadcasting channel that is currently being viewed on the screen of the display apparatus 300 and the image of the data broadcasting service can be displayed at the same time.

For this, the application data for the data broadcasting service in the hotel may be transmitted together with the broadcasting signal over the communication network 130 in the hotel, by using the dedicated data channel independent of the broadcasting channels through which the broadcasting signals are transmitted.

That is, the application data for the data broadcasting service in the hotel may be transmitted to the broadcast receiving apparatus 200 through the dedicated data channel independent of the broadcasting channels through which the broadcasting signals from the broadcast transmitting apparatus 110 are transmitted. In more detail, the broadcasting channels do not even include a portion of the application data for the data broadcasting service in the hotel, and the dedicated data channel may include only the application data.

Accordingly, the data broadcasting service in the hotel may be provided together with the image of the broadcasting channel by using the application data that are received through the dedicated data channel when a user desires it, irrespective of a broadcasting channel which the user is currently viewing.

Figure 3:
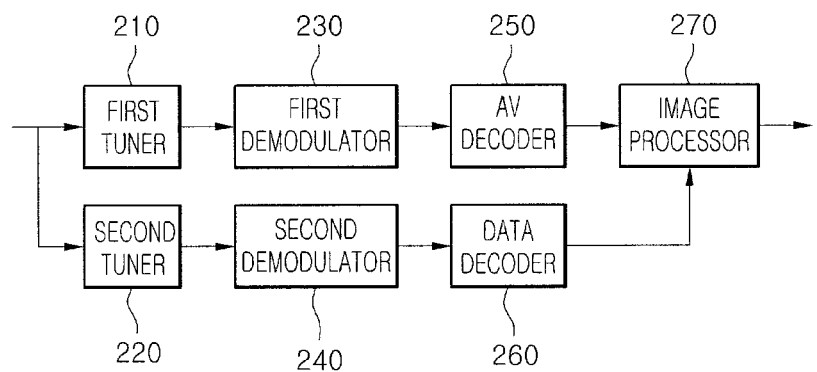
FIG. 3 is a block diagram illustrating the configuration of a broadcast receiving apparatus according to an embodiment.

FIG. 3 is a block diagram illustrating the configuration of the broadcast receiving apparatus 200 according to an embodiment. The broadcast receiving apparatus 200 may include a plurality tuners 210 and 220, a plurality of demodulators 230 and 240, a plurality of decoders 250 and 260, and an image processor 270.

Referring to FIG. 3, the first tuner 210 receives an broadcasting signal corresponding to a broadcasting channel that is selected by a user among a broadcasting signal which is transmitted from the head end apparatus 100, wherein the first tuner 210 may also receive the audio signal of the broadcasting channel together.

The second tuner 220 extracts a signal corresponding to the dedicated data channel among a broadcasting signal which is transmitted from the head end apparatus 100, and receives the application data for the data broadcasting service in hotels.

That is, the second tuner 220 may be a tuner that is stayed in the dedicated data channel and receives only the application data from the data server 120 of a hotel.

In this way, the second tuner 220 receives the signal of the dedicated data channel independent of the broadcasting channel that is received in the first tuner 210, and thus the broadcast receiving apparatus 200 may simultaneously receive the broadcasting signal of the broadcasting channel that is selected by the user and the application data for the data broadcasting service in hotels.

Moreover, even if a broadcasting channel that the user is currently viewing is not changed to a channel through which the application data are transmitted, the broadcast receiving apparatus 200 may receive both the application data for the data broadcasting service in hotels and the broadcasting signal of the broadcasting channel.

The first demodulator 230 may correct the error of the broadcasting signal of the broadcasting channel that is received from the first tuner 210 and change the broadcasting signal into the TS type. The AV decoder 250 may decode the received video signal and an audio signal to change the signals into a signal type that may be outputted in the display apparatus 300.

The second demodulator 240 performs the above-described demodulation operation on the application data that are received from the second tuner 220. The data decoder 260 may decode the application data to configure an image for the data broadcasting service in hotels.

For example, the data decoder 260 may decode the application data according to the ACAP standard protocol to configure an image for the data broadcasting service in hotels.

More specifically, the data decoder 260 may parse the AIT session of the application data to read an identifier corresponding to the DSM-CC data, and filter the DSM-CC data of a location (which corresponds to the identifier), thereby extracting substantial information for providing the image of the data broadcasting service in hotels.

The image processor 270 may combine the image data of a broadcasting channel that is outputted from the AV decoder 250 with the image data of a data broadcasting service that are outputted from the data decoder 260 so that the image of a broadcasting channel that is selected by the user and the image of the data broadcasting service can be simultaneously displayed on one screen in the display apparatus 300.

Figure 4:
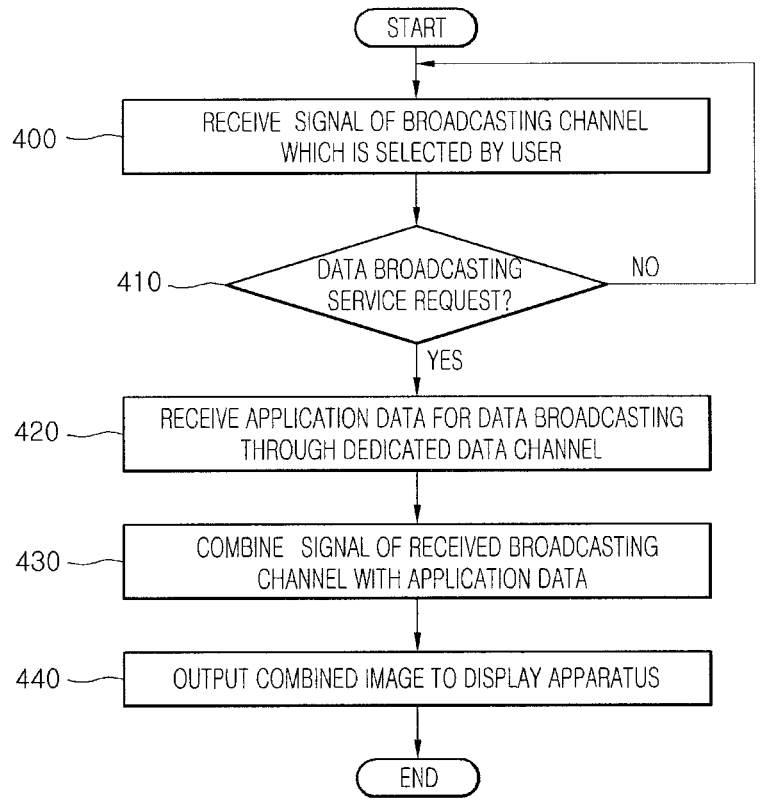
FIG. 4 is a flowchart illustrating a broadcast receiving method according to an embodiment.

FIG. 4 is a flowchart illustrating a broadcast receiving method according to an embodiment. The broadcast receiving method in FIG. 4 will be described below with reference to the block diagram of FIG. 3.

Referring to FIG. 4, the first tuner 210 receives an broadcasting signal of a broadcasting signal corresponding to a broadcasting channel that is selected by a user in operation 400. The received broadcasting signal is sequentially processed through the first demodulator 230 and the AV decoder 250 to be changed into image data that may be displayed in the display apparatus 300, and the changed image data are inputted to the display apparatus 300. The display apparatus 300 displays the image of the broadcasting channel that is selected by the user, by using the input image data.

As described above, while the image of the broadcasting channel that is selected by the user is being displayed in the display apparatus 300, the broadcasting system determines whether the user requests the data broadcasting service of a hotel in operation 410.

When the data broadcasting service is requested, the second tuner 220 receives the application data of a broadcasting signal that is transmitted from the head end apparatus 100 by using the dedicated data channel in operation 420.

At this point, because the application data are received to the second tuner 220 instead of the first tuner 210, through the dedicated data channel independent of the broadcasting channel, it is not required to change a broadcasting channel that the user is currently viewing. That is, while the user is continuously viewing the broadcasting channel through the display apparatus 300, the broadcast receiving apparatus 200 may receive the application data for the data broadcasting service in the hotel through the dedicated data channel by using the second tuner 220.

The application data that are received in the second tuner 220 are outputted through the second demodulator 240 and the data decoder 260. The image processor 270 may receive both the image data of a broadcasting channel that is outputted from the AV decoder 250 and the image data of a data broadcasting service that is outputted from the data decoder 260.

Subsequently, the image processor 270 combines the image data of the input broadcasting channel with the image data of the data broadcasting service in the hotel in operation 430, and outputs the combined image data to the display apparatus 300 in operation 440.

For example, the image processor 270 may combine the image data so that the image of the broadcasting channel can be displayed as the background of a screen, and the image of the data broadcasting service in the hotel can be displayed to overlap on the image of the broadcasting channel.

Moreover, the image processor 270 may combine the image data so that any one of the image of the broadcasting channel and the image of the data broadcasting service in the hotel can be displayed in a Picture In Picture (PIP) type.

Figure 5:
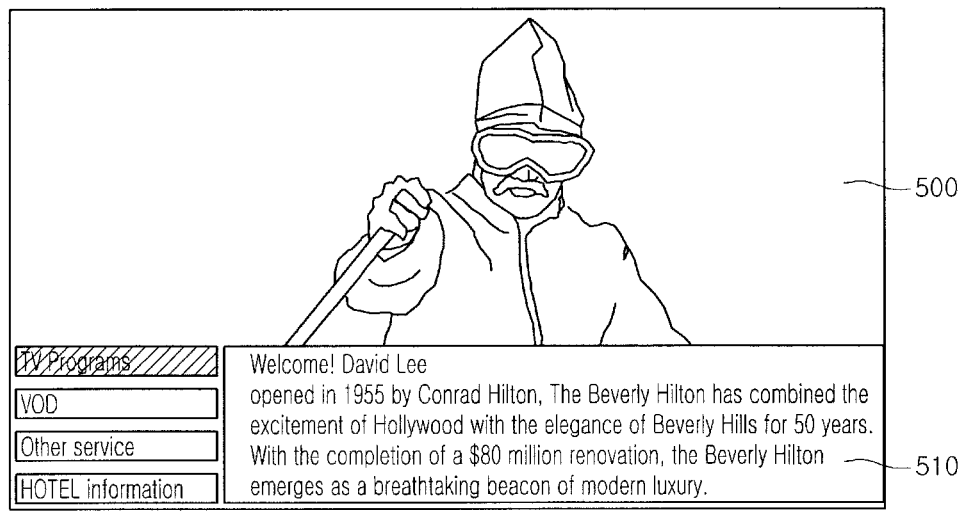
FIGS. 5 and 6 are diagrams illustrating screens to which a data broadcasting service in hotels is provided.
Figure 6:

FIGS. 5 and 6 are diagrams illustrating screens to which the data broadcasting service in the hotel is provided.

As shown in FIG. 5, the image 500 of the broadcasting channel that is selected by the user is displayed on the screen of the display apparatus 300, and the user may request the data broadcasting service in hotels while viewing the broadcasting channel.

In this case, the application data for the data broadcasting service in the hotel and the broadcasting signal of the broadcasting channel are simultaneously received through the dedicated data channel. Therefore, as shown in FIG. 5, the image 510 of the data broadcasting service in the hotel may be displayed to overlap on the image 500 of the broadcasting channel 500 without the change of the broadcasting channel that the user is viewing.

As shown in FIG. 6, when the user requests the data broadcasting service in the hotel, the image 610 of the data broadcasting service in the hotel is displayed on a screen, and the image 600 of the broadcasting channel that the user is viewing may be continuously displayed on a portion of a screen in the PIP type.

Figure 7:
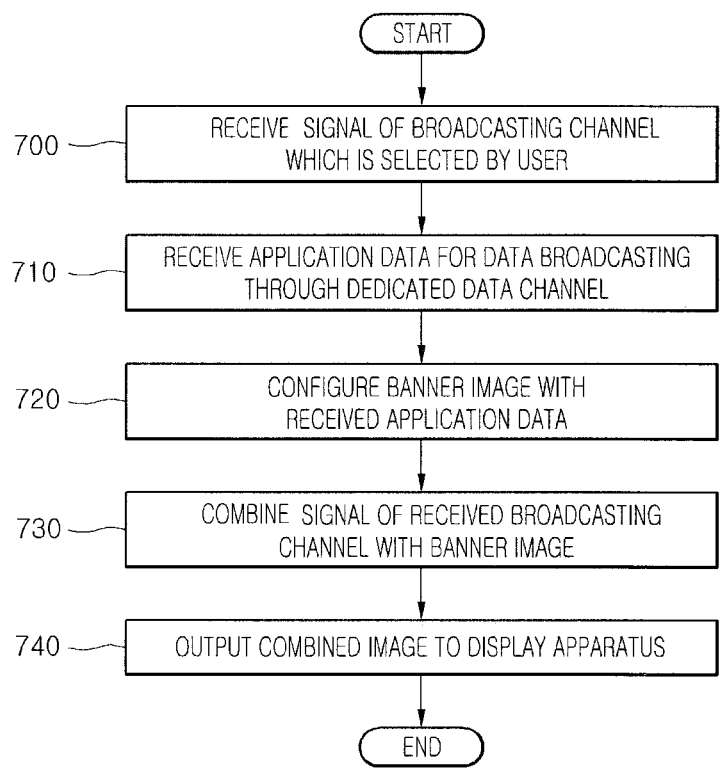
FIG. 7 is a flowchart illustrating a broadcast receiving method according to another embodiment.

FIG. 7 is a flowchart illustrating a broadcast receiving method according to another embodiment. FIG. 7 illustrates the broadcast receiving method for providing a banner service in hotels. Hereinafter, the broadcast receiving method in FIG. 7 will be described with reference to the block diagram of FIG. 3.

Referring to FIG. 7, the first tuner 210 receives a broadcasting signal corresponding to a broadcasting channel that is selected by a user in operation 700. The received broadcasting signal is sequentially processed through the first demodulator 230 and the AV decoder 250 to be changed into image data that may be displayed in the display apparatus 300, and the changed image data are inputted to the display apparatus 300. The display apparatus 300 displays the image of the broadcasting channel that is selected by the user, by using the input image data.

The second tuner 220 receives the application data of a broadcasting signal that is transmitted from the head end apparatus 100 by using the dedicated data channel in operation 710. The application data may be an application for displaying a banner image (which is composed of text and the like) in the display apparatus 300. For example, the application data may be an Xlet application that is implemented with Java for providing a banner advertisement service which is the data broadcasting service according to an embodiment.

The Xlet application may configure the banner image with banner attribute information in which attributes for displaying a banner are defined and a banner manager for displaying a banner on a screen using the banner attribute information.

Subsequently, the broadcast receiving apparatus 200 configures a banner image with the application data that are received in the second tuner 220 in operation 720. That is, the application data that are received in the second tuner 220 are outputted through the second demodulator 240 and the data decoder 260. The image processor 270 may receive both the image data of a broadcasting channel that is outputted from the AV decoder 250 and banner image data that are outputted from the data decoder 260.

The image processor 270 combines the image data of the input broadcasting channel with the banner image data in operation 730, and outputs the combined image data to the display apparatus 300 in operation 740.

Figure 8:
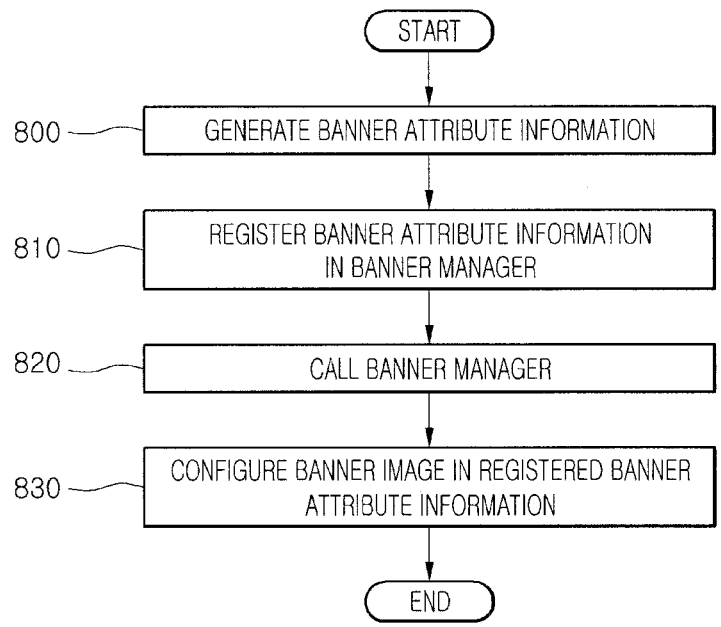
FIG. 8 is a flowchart illustrating a method for configuring a banner image with application data, according to an embodiment.

FIG. 8 is a flowchart illustrating a method for configuring the banner image with the application data in operation 720, according to an embodiment.

Referring to FIG. 8, the application, for example, the Xlet application, obtains the banner attribute information in operation 800. That is, the Xlet application may obtain the banner attribute information by using the received application data.

The banner attribute information is that in which attributes for displaying banners are defined, and may include information such as content (for example, the content of a banner message) that is displayed on the banner, a banner display location (for example, the upper portion or lower portion of a screen), a banner display type (for example, a banner location is moved in a slide type or is fixed at a specific location), the background or text color of the banner, transparency with respect to the background image of the banner and the font or size of text which is displayed on the banner.

As an example, the banner attribute information "BannerAttribute" may be realized with Java as follows.

```
package org.ad;
import java.awt.Color;
import java.awt.Font;
public interface BannerAttribute {
    /* location of message */
    public final static int TOP = 1;
    public final static int BOTTOM = 2;
    /* mode of message */
    public final static int STATIC = 1;
    public final static int SLIDE = 2;
    abstract public int getRpeatCount( );
    abstract public int getDelay( );
    abstract public Font getFont( );
    abstract public int getAlpha( );
    abstract public int getLocation( );
    abstract public int getDisplayMode( );
    abstract public int getSlideTime( );
```

In operation 800, the Xlet application may determine the attributes of the banner to generate the banner attribute information "BannerAttribute" having the above-described configuration.

Afterwards, the Xlet application registers the banner attribute information (which has been generated in operation 800) in a banner manager in operation 810.

The banner manager may directly configure a banner image, which is displayed on a screen, on the basis of the generated banner attribute information. For this, the banner manager may be realized with a Java class as follows.

```
package org.ad;
public abstract class BannerManager {
    /* state of message */
    public final static int MESSAGE_NOT_READY_STATE = 1;
    public final static int MESSAGE_READY_STATE = 2;
    public final static int MESSAGE_IN_PROGRESS_STATE = 3;
    public final static int MESSAGE_PAUSE_STATE = 3;
    public static BannerManager getInstance( ) {
        return null;
    }
    abstract public void setBanner(BannerAttribute banner);
    abstract public BannerAttribute getBanner( );
    abstract public void showMessage( );
    abstract public void hideMessage( );
    abstract public void pauseMessage( );
    abstract public void resumeMessage( );
    abstract public int getState( );
}
```

The banner manager "BannerManager" receives the banner attribute information "BannerAttribute" that is generated from the Xlet application, and may change the state of the banner that is displayed on a screen. For this, the banner manager may be configured to include a plurality of Application Programming Interfaces (APIs).

In more detail, the banner manager "BannerManager" may include a state control API "setBanner" for controlling the output of the banner according to a command that is inputted from the Xlet application, and a state information API "getBanner" for representing the current output state of the banner.

For example, the four kinds of banner states may be represented by the state information API "getBanner". Specifically, the four kinds of banner states may include a previous banner configuration state "Not Ready state" in which a banner image is not ready yet, a banner configured but not displayed state "Ready state in which a banner image is ready but is not displayed, a banner display state "In Progress state" in which a banner image is being displayed on a screen, and a banner pause state "Pause state" in which the display of a banner pauses.

When intending to display a banner image on a screen, the application calls the banner manager that registers the banner attribute information in operation 820, and the called banner manager configures the banner image on the basis of the registered banner attribute information in operation 830.

For example, the Xlet application transmits a showMessage command to the banner manager "BannerManager". The banner manager "BannerManager" receiving the showMessage command may allow the banner image to be displayed on a screen on the basis of information on the attributes of the banner that have been defined in the registered banner attribute information "BannerAttribute".

According the above-described method, the broadcast receiving apparatus 200 may configure a banner image with the application data (which are received from the head end apparatus 100), for example, the Xlet application. The broadcast receiving apparatus 200 may combine the banner image with the image of the broadcasting channel, and output the combined image to the display apparatus 300. Accordingly, both the image of the broadcasting channel and the banner image having attributes that are described in the banner attribute information "BannerAttribute" may be displayed on the screen of the display apparatus 300.

Figure 9:
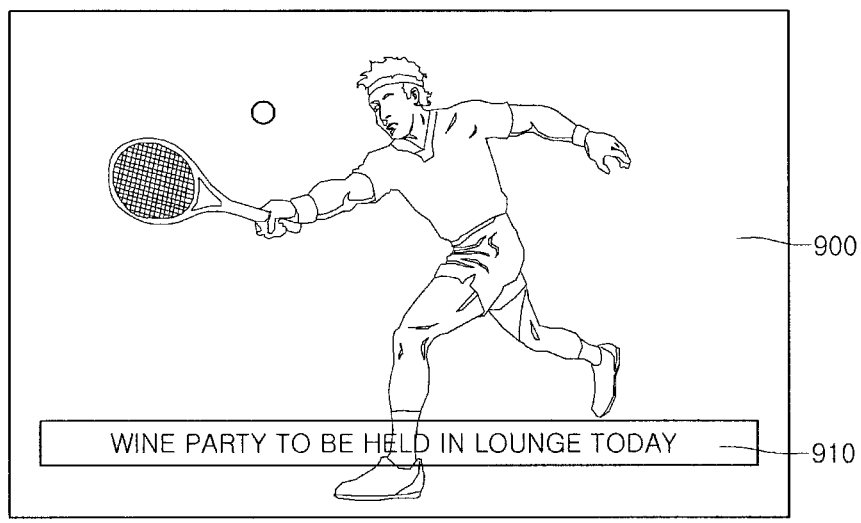
FIG. 9 is a diagram illustrating a screen to which a banner service in hotels is provided.

FIG. 9 is a diagram illustrating a screen to which a banner service in hotels is provided. FIG. 9 illustrates a banner advertisement service screen which is provided by the above-described method, according to an embodiment.

Referring to FIG. 9, the image 900 of a broadcasting channel that is selected by the user is displayed on the screen of the display apparatus 300, the banner image 910 may be displayed to overlap on the image 900 of the broadcasting channel.

As described above, since the application data for the banner advertisement service and the image signal of the broadcasting channel are simultaneously received through the dedicated data channel, hotels may display the banner image 910 including desired content at a desired time in order for the banner image 910 to overlap on the image 900 of the broadcasting channel, irrespective of a broadcasting channel that the user is viewing.

In the above description, although the broadcast receiving method and apparatus and the broadcasting system according to embodiments have exemplified a case of providing the data broadcasting service in hotels, it is not limited thereto. The broadcast receiving method and apparatus and the broadcasting system may be used for various data broadcasting services that are provided in limited spaces such as hotels and hospitals.

The broadcast receiving method according to embodiments can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet).

The computer-readable storage medium can also be distributed over network coupled computer systems so that the computer readable codes are stored and executed in a distributed fashion. Also, functional programs, codes, and code segments for accomplishing embodiments can be easily construed by programmers skilled in the art to which the present invention pertains.

According to embodiments, by receiving the application data for the data broadcasting through the dedicated data channel independent of the broadcasting channels, the broadcasting system can provide the data broadcasting service to users without the change of the broadcasting channel that the users are currently viewing. Moreover, the broadcasting system separately includes the tuner for receiving the application data of the dedicated data channel, and thus can easily realize the data broadcasting service that is provided in limited spaces such as hotels, independently of the general broadcasting service.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for receiving broadcasting signal, comprising:
   receiving a broadcasting signal of a broadcasting channel selected by a user, the broadcasting signal received through a first tuner;
   receiving a request signal for a data broadcasting service;
   extracting a signal of a data channel after receipt of the request signal, wherein the data channel is configured independently from the broadcasting channel, and wherein the data channel signal is received through a second tuner;
   receiving application data corresponding to the data broadcasting service through the data channel;
   combining the received broadcasting signal with the received application data for display on screen;
   obtaining banner attribute information registered in a banner manager based on the received application data; and
   displaying a banner image based on the obtained banner attribute information;
   wherein the banner manager changes an output state of the banner image, and
   the output state of the banner image includes a not ready state, a ready state, an in progress state and a pause state.

2. The method according to claim 1, wherein the broadcasting signal and the application data are simultaneously received.

3. The method according to claim 1, wherein the broadcasting signal and the application data are received through a radio frequency (RF) cable.

4. The method according to claim 1, wherein the data broadcasting service is a data broadcasting service of a building.

5. The method according to claim 4, wherein the application data are received from a data server in the building.

6. The method according to claim 1, wherein the banner attribute information comprises at least one of a content, display location, display type, color, transparency, or text font size of the banner.

7. The method according to claim 1, wherein:
   the banner image is displayed based on the banner manager.

8. The method according to claim 7, wherein the banner manager comprises:
   a state control Application Programming Interface (API) for controlling an output of the banner image; and
   a state information API for representing the output state of the banner image.

9. An apparatus for receiving broadcasting signal, comprising:
   a first tuner to receive a broadcasting signal of a broadcasting channel;
   a second tuner to extract a signal of a data channel that is configured independently from the broadcasting channel, and to receive application data for a data broadcasting service; and
   an image processor to combine the received broadcasting signal with the received application data for simultaneous display on a screen,
   wherein the apparatus obtains banner attribute information registered in a banner manager based on the received application data and displays a banner image based on the obtained banner attribute information,
   wherein the banner manager changes an output state of the banner image,
   the output state of the banner image includes a not ready state, a ready state, an in progress state and a pause state.

10. The apparatus according to claim 9, wherein the application data is received without change of a broadcasting channel that a user is currently viewing.

11. The apparatus according to claim 9, wherein while the first tuner is receiving the broadcasting signal, the second tuner receives the application data.

12. The apparatus according to claim 9, wherein the data broadcasting service is a data service of a building.

13. A broadcasting system for providing a data broadcasting service, the broadcasting system comprising:
- a transmitter to transmit a broadcasting signal;
- a data server to provide application data for the data broadcasting service;
- a receiver to receive the broadcasting signal from the transmitter through a broadcasting channel of a first tuner, to receive the application data from the data server through a dedicated data channel through a second tuner, and to combine information including the received broadcasting signal with the received application data, wherein the dedicated data channel is configured independently from the broadcasting channel, wherein the receiver obtains banner attribute information registered in a banner manager based on the received application data and displays a banner image based on the obtained banner attribute information, wherein the banner manager changes an output state of the banner image, and the output state of the banner image includes a not ready state, a ready state, an in progress state and a pause state.

14. The broadcasting system according to claim 13, wherein the receiver receives the application data through the dedicated data channel without changing a broadcasting channel that a user is currently viewing.

15. The broadcasting system according to claim 13, wherein the broadcasting signal and the application data are received by the receiver through a radio frequency (RF) cable.

16. The broadcasting system according to claim 14, wherein the receiver receives banner attribute information based on the application data received from the data server, and configures the banner image based on the obtained banner attribute information.

* * * * *